July 16, 1957 — E. W. WAGNER — 2,799,373
VEHICLE SPEED GOVERNOR
Filed April 24, 1956 — 2 Sheets-Sheet 1

INVENTOR.
EDWARD W. WAGNER
BY
McMorrow, Berman & Davidson
ATTORNEYS

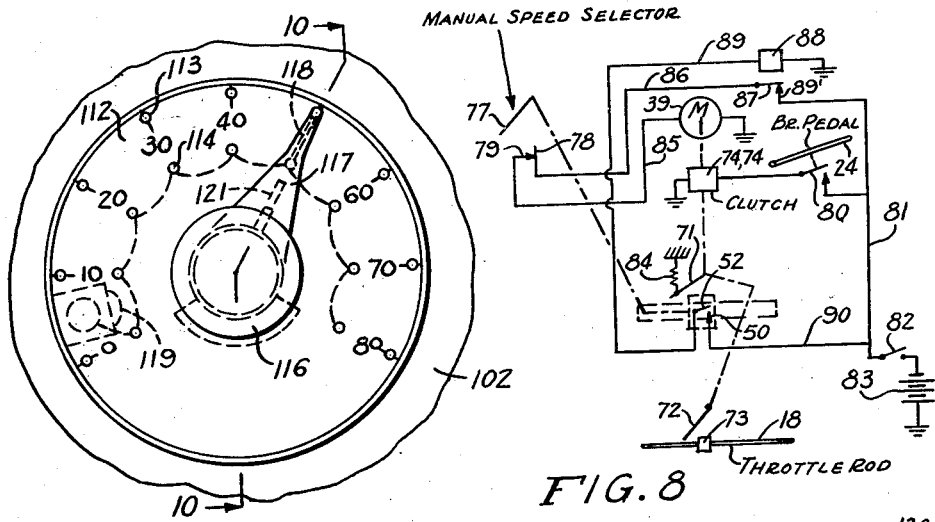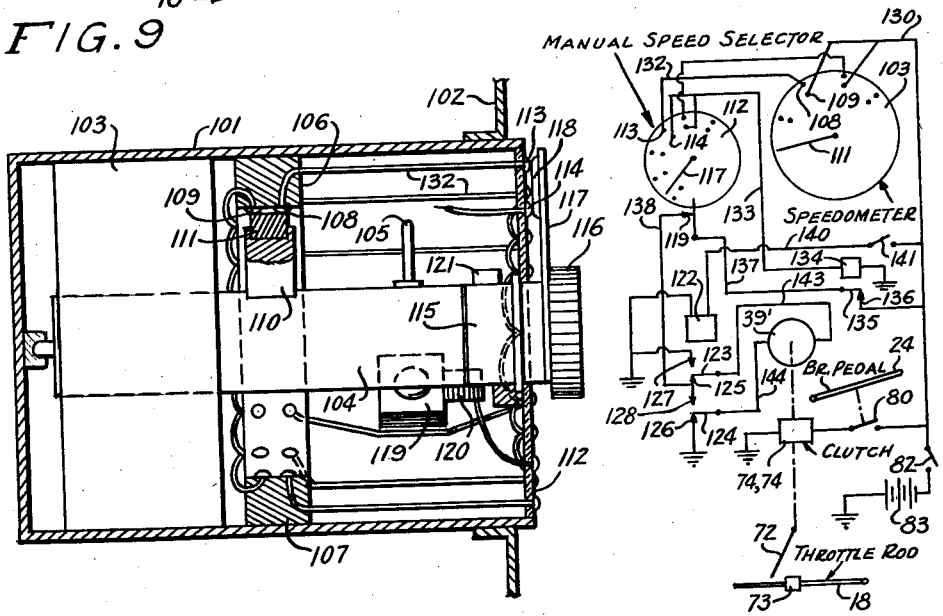

United States Patent Office 2,799,373
Patented July 16, 1957

2,799,373
VEHICLE SPEED GOVERNOR

Edward W. Wagner, Parma, Ohio

Application April 24, 1956, Serial No. 580,273

8 Claims. (Cl. 192—3)

This invention relates to vehicle speed controls, and more particularly to an improved motor vehicle throttle control apparatus for setting the vehicle throttle to a position corresponding to a desired speed and for holding the throttle in said position.

A main object of the invention is to provide a novel and improved motor vehicle throttle control apparatus provided with means whereby the operator of the vehicle may predetermine the speed of the vehicle by operating a manual speed selector, the apparatus operating automatically to move the throttle of the vehicle engine to a position corresponding to the selected speed and holding the throttle at said selected position until the operator of the vehicle changes the speed setting or returns the apparatus to its zero condition.

A further object of the invention is to provide an improved speed selecting apparatus for a motor vehicle, said apparatus involving relatively simple components, being easy to operate, and allowing the operator of the motor vehicle to select any desired speed which the vehicle engine is capable of providing, the apparatus holding the throttle of the vehicle engine in a position corresponding to the selected speed until the vehicle brakes are applied, or the setting of the apparatus is manually changed.

A still further object of the invention is to provide an improved throttle-positioning apparatus for a motor vehicle, said apparatus involving inexpensive components, being reliable in operation, and being easy to install on a conventional motor vehicle, the apparatus providing a means for manually establishing the speed of the vehicle and for retaining the vehicle speed until either the setting of the apparatus is manually changed, or the vehicle brakes are applied.

A still further object of the invention is to provide an improved vehicle speed selecting and maintaining apparatus for use on a conventional motor vehicle, the apparatus being arranged so that the operator of the vehicle may select the speed desired for the vehicle and set the apparatus for said desired speed, the apparatus establishing this speed by moving the throttle of the vehicle engine to a corresponding position, associated with the desired speed and for holding the throttle in said position until the setting is returned to a zero condition or the vehicle brakes are applied, the apparatus being further arranged so that the speed setting may be varied, as desired by the operator, at any time.

Further objects and advantages of the invention will become apparent from the following description and claims, and from the accompanying drawings, wherein:

Figure 8 is a schematic diagram illustrating the electrical connections employed in the speed control apparatus illustrated in Figures 1 to 7.

Figure 9 is a fragmentary elevational view of a portion of the dashboard of a motor vehicle equipped with a modified form of speed controlling apparatus, according to this invention, and showing the combined speedometer and manual speed selector of the apparatus.

Figure 10 is a longitudinal vertical cross sectional view taken through the combination speedometer and manual speed selector on the line 10—10 of Figure 9.

Figure 11 is a diagram illustrating electrical connections of the modified form of motor vehicle speed control apparatus associated with Figures 9 and 10.

Figures 1, 2:
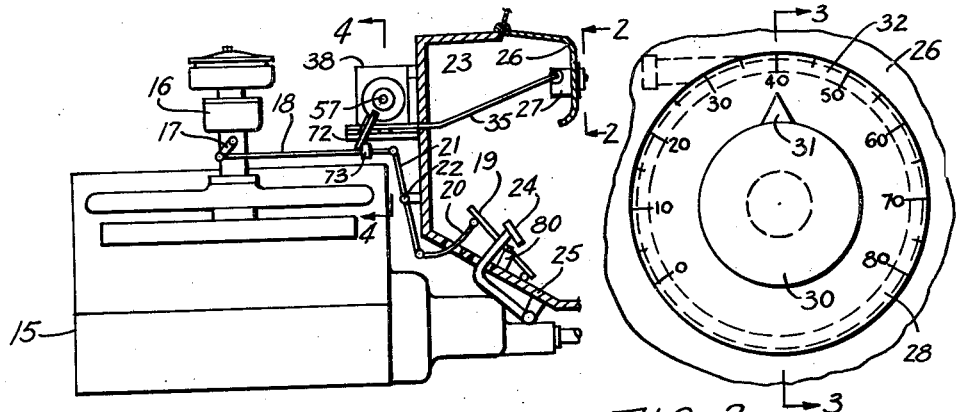
Figure 1 is a fragmentary vertical cross sectional view taken through a motor vehicle provided with one form of speed controlling apparatus according to the present invention, the vehicle engine being shown in side elevation and the components of the speed controlling apparatus being shown mounted on portions of the vehicle adjacent the engine.
Figure 2 is an enlarged elevational detail view showing the portion of the vehicle instrument panel on which is mounted the manual speed selector forming part of the speed control apparatus employed in the form of the invention illustrated in Figure 1.
Figure 5:
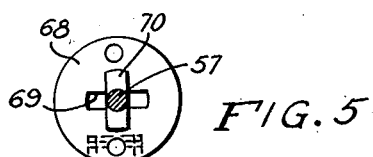
Figure 5 is a cross sectional detail view taken on line 5—5 of Figure 4.

Referring to the drawings, and more particularly to Figures 1 to 8, 15 designates the engine of a motor vehicle, said engine being provided with the usual carburetor 16 having the rotatable throttle lever 17. Connected to the throttle lever 17 is the linearly movable throttle rod 18, said throttle rod being linked to the motor vehicle accelerator pedal 19 by conventional linkages, including, for example, the link arm 20 and the additional link arm 21 which is pivoted at 22 at its intermediate portion to the fire wall 23 of the vehicle.

The vehicle is provided with the usual brake pedal 24, the pedal 24 being pivotally mounted adjacent to the accelerator pedal 19 in the flood board 25.

The vehicle is provided with the usual instrument panel 26. Mounted in said instrument panel is a circular housing 27 which is provided with the calibrated front wall 28, and in which is axially journaled a shaft 29 extending through the housing and provided on its forward end with a knob 30 having the radially extending pointer element 31.

As shown in Figure 2, the front wall 28 of the housing 27 is calibrated with speed values, defining a speed selecting scale 32, the pointer element 31 being movable opposite the values of said scale. Secured on the shaft 29 within the housing 27 is a spool 33 on which are wound several turns of a flexible cable 34, said cable extending through a relatively rigid tubular sheath 35 and being slidable in said sheath, whereby the rotation of the knob 30 will cause the two elements of the cable, shown at 36 and 37 in Figure 3, to move longitudinally relative to each other.

Figure 4:
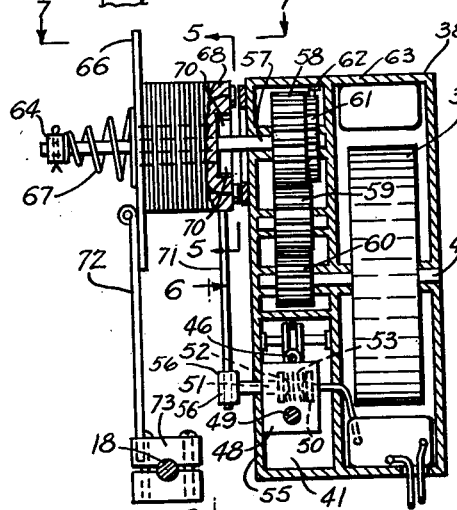
Figure 4 is an enlarged transverse vertical cross sectional view taken on the line 4—4 of Figure 1.
Figure 6:
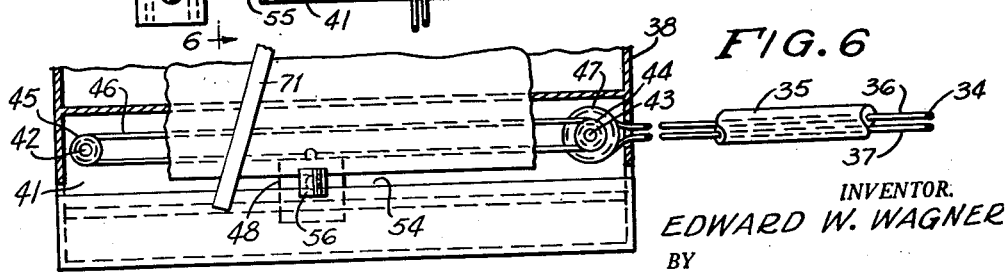
Figure 6 is a fragmentary elevational detail view, partly in vertical cross section, of the lower portion of the housing for the throttle-positioning motor employed in the apparatus of Figure 1, said view being taken on the line 6—6 of Figure 4 and showing in particular the movable control element which is positioned by the manual speed selector of Figures 2 and 3.

Secured to the fire wall 23 adjacent the vehicle engine 15 is a housing 38 in which is mounted an electric motor 39 having a drive member or the transversely extending shaft 40, as shown in Figure 4. The lower portion of housing 38 comprises an elongated, horizontally extending compartment 41, and journaled transversely in the opposite end portions of the compartment 41 are respective pulley shafts 42 and 43. Secured on said pulley shafts are respective pulleys 44 and 45 which are coupled together by an endless belt 46 which extends horizontally and longitudinally through the compartment 41, as is clearly shown in Figure 6. Also secured on the shaft 43 is a cable spool 47 on which are wound several turns of the cable 34, connecting the cable elements 36 and 37 contained in the sleeve 35, whereby the shaft 43 is rotated responsive to rotation of the knob 30, namely, responsive to the relative longitudinal movement of the cable elements 36 and 37, as above described.

Secured to the lower run of the belt 46 is a depending switch housing 48 which is slidably supported on a longitudinally extending horizontal rod 49 rigidly secured between the opposite end walls of housing 38 and extending slidably through the switch housing 48. The switch housing 48 is preferably made of insulating material and has secured to its rear wall a stationary contact 50. Movably mounted in the housing 48 is a plunger member 51 carrying a contact element 52, said plunger element being in transverse alignment with the contact 50 and the contact 52 being movable into conductive engagement with said contact 50 when the plunger element 51 is moved inwardly. Plunger element 51 is biased outwardly with respect to the contact 50 by the provision of a suitable coiled spring 53 bearing between the contact members 52 and 50 and suitably insulated therefrom. The plunger element 51 extends slidably through a longitudinal slot 54 provided in the front wall 55 of housing 38 and has secured to its outer end a generally triangular vertical prismatic head control element 56.

Suitably journaled in the upper portion of housing 38 parallel to the motor shaft 40 is a driven member or shaft 57 on which a large gear 58 is secured. The gear 58 is driven from shaft 40 by means of an idler gear 59 which meshes with gear 58 and with a relatively small pinion gear 60 secured on shaft 40, as is clearly shown in Figure 4. Gear 58 is provided with a ratchet-toothed portion 61 whose periphery is resiliently engaged by a spring pawl 62 secured to the top wall 63 of housing 38, whereby rotation of shaft 57 is limited to only one direction, for example, to a counterclockwise direction, as viewed from the front of the housing, namely, as viewed in Figure 1.

The shaft 57 projects a substantial distance forwardly from the front wall 55 of housing 38 and has a bearing collar 64 secured to its forward end. Slidably and rotatably engaged on the shaft 57 is a sleeve member 65 to the forward end of which is secured a relatively large disc member 66. A coiled spring 67 surrounds the forward portion of shaft 57, bearing at its forward end on the collar 64 and at its rear end on the disc member 66, biasing the disc member and sleeve 65 rearwardly, toward the front wall 55 of housing 38.

The sleeve member 65 is formed at its rear end with an enlarged portion 68 formed with a pair of diametrically extending recesses 69 intersecting at right angles to each other at the axis of shaft 57 and normally receiving therein the oppositely projecting radial stud elements 70, 70 rigidly secured to shaft 57 and keying said shaft to the sleeve member 65.

Rigidly secured to the enlarged portion 68 of sleeve member 65 and extending radially therefrom is a follower rod 71 which normally lies in substantially the same vertical plane as the cam-like head 56 of plunger member 51, and being cammingly engageable with said head 56 responsive to rotation of the sleeve member 65.

Rotation of sleeve member 65 causes the follower rod 71 to engage the triangular cam-like head 56 and to move the plunger member 51 inwardly, bringing the contact element 52 into conductive engagement with the contact 50, as will be presently described.

Secured to the disc 66 and extending radially therefrom is a throttle-positioning rod 72 which is engageable with an abutment block 73 secured on the throttle rod 18, whereby counterclockwise rotation of the disc member 66, as viewed in Figure 1, causes the rod 72 to engage the block 73 and to move the throttle rod 18 to the right, as viewed in Figure 1, rotating the throttle lever 17 counterclockwise and opening the associated throttle. Suitable spring means, not shown, and of conventional construction, are provided biasing the throttle lever 17 clockwise, namely, toward speed-reducing position, and biasing the throttle rod 18 to the left, as viewed in Figure 1.

Mounted on the upper portion of the housing front wall 55 behind the disc 66 and symmetrically located on opposite sides of shaft 57 are a pair of electromagnets 74, 74 having the outwardly extensible plungers 75, 75, said plungers being engageable with the rear surface of the disc 66. The plungers 75, 75 have non-magnetic end portions located adjacent the rear surface of the disc 66, and when the electromagnets 74, 74 are energized, the plungers are moved to extend their non-magnetic end portions into engagement with the rear surface of the disc 66 and to exert a force on the disc sufficient to move disc 66 and sleeve member 65 forwardly to disengage the enlarged clutch portion 68 of the disc from the keying studs 70, 70. This forward movement is also sufficient to cause the rods 71 and 72 to move forwardly a sufficient amount so that they no longer engage the respective elements 56 and 73. This allows plunger member 51 to move outwardly by the biasing force exerted thereon by spring 53 so as to separate the contact element 52 from contact element 50, and also causes the biasing means associated with the throttle rod 18 to return the throttle rod toward speed-reducing position, namely, toward the idling position thereof.

It will be understood that the guide sheath 35 is suitably secured so as to be held stationary, and that said guide sheath is of sufficient length so that the portions of the endless cable 34 looped around the respective spools 33 and 47 will be securely held in contact with the surfaces of said spools so as to prevent slippage of the cable with respect to the spools.

Obviously any other suitable means for transmitting the rotation of knob 30 to shaft 43 may be employed, such as flexible shafting, a suitable linkage, suitable shafting and gearing, or the like.

Figures 3, 7:
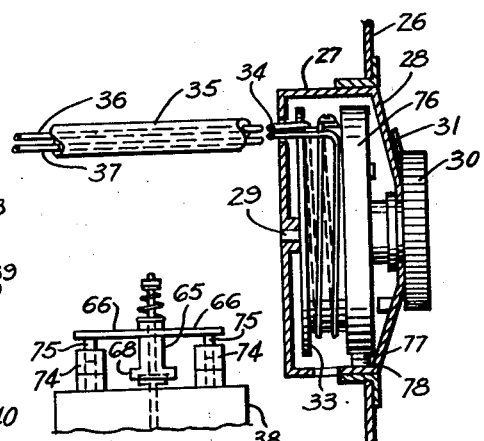
Figure 3 is a vertical cross sectional view taken on the line 3—3 of Figure 2.
Figure 7 is a fragmentary top view, to a smaller scale, taken on the line 7—7 of Figure 4.

As shown in Figure 3, the spool 33 is formed at one side thereof, namely, the forward side thereof adjacent the wall 28 of housing 27, with a disc element 76 of substantial thickness, said disc element carrying a projection 77 at its periphery engageable with the actuating member 78 of a normally closed limit switch 79 mounted in the lower portion of housing 27. Projection 77 engages element 78 to open the limit switch 79 when the manual speed selecting knob 30 is returned to its zero position. When said knob 30 is rotated clockwise, as viewed in Figure 2, from its zero position, the switch 79 closes.

Mounted adjacent the brake pedal 24 is a normally open switch 80 which is engageable by the pedal when the pedal is depressed. The switch 80 may be any conventional type of brake pedal actuated switch, similar to the conventional stoplight switch employed in most modern motor vehicles. Thus, the switch 80 may be actuated either by mechanical contact with the brake pedal 24 or by the fluid pressure developed in the brake system when the control pedal of the conventional hydraulic brake system is depressed.

Referring to Figure 8, it will be seen that the switch 80 is connected between a wire 81 and the terminals of the clutch solenoids 74, 74 represented in Figure 8 as a single unit, but actually being connected in parallel with each other. Thus, the switch 80 is connected between the wire 81 and one terminal of the parallel connected solenoids, the other terminal of the parallel connected solenoids being connected to ground. Wire 81 is connected through a main control switch 82 to the ungrounded terminal of the vehicle battery 83. Therefore, when the brake pedal 24 is depressed, the switch 80 is closed, connecting the solenoids 74, 74 to the battery 83, assuming main switch 82 to be closed, whereby the solenoids become energized and move disc member 66 forwardly, disengaging the sleeve 65 from shaft 57 and disengaging the rod 72 from block 73, allowing the throttle rod 18 to return to its idling position. At the same time, as above explained, contacts 52 and 50 become separated.

A biasing spring, shown at 84 in Figure 8 is connected between rod 71 and a portion of the vehicle frame, to bias rod 71 and sleeve 65 in a clockwise direction, as viewed in Figure 1, whereby said sleeve and rod return to a starting position when the sleeve member 65 is disengaged from the clutch studs 70, 70 by the energization of the clutch solenoids 74, 74, as above explained. The throttle-rod actuating member 72 likewise returns to a normal starting position under these conditions.

As shown in Figure 8, one terminal of motor 39 is grounded and the other terminal is connected to a wire 85. Wire 85 is connected to one terminal of switch 79. The other terminal of the switch is connected by a wire 86 to the armature 87 of a relay 88. The stationary contact 89' of relay 88 is connected to wire 81. Thus, with relay 88 deenergized, motor 39 is connected to the ungrounded terminal of battery 83 when switch 82 is closed, whereby said motor 39 will become energized whenever switch 82 is closed and the knob 30 of the manual speed selector is rotated away from its zero position.

One terminal of the winding of relay 88 is grounded. The other terminal of said winding is connected by a wire 89 to the movable contact element 52. Stationary contact element 50, engageable by the movable contact 52, is connected by a wire 90 to wire 81.

Therefore, following the energization of motor 39, and the consequent rotation of the follower member 71, said follower member 71 eventually engages the head portion 56 of the control plunger 51, moving said plunger inwardly so that contact 52 engages contact 50. It will be understood that this occurs at a position of the control member 48 corresponding to the setting of the pointer 31 of the speed selecting knob 30.

When switch element 52 engages switch element 50, the winding of relay 88 becomes energized, since the ungrounded terminal of the relay winding is then connected by wire 89, switch contacts 52 and 50, and wire 90 to the battery wire 81. Armature 87 then disengages from contact 89', deenergizing the motor 39, and terminating the movement of the throttle-rod positioning member 72.

As above explained, when the follower member 71 reaches a postion corresponding to the setting of the speed selector knob 30, namely, the position of the control member 48, the winding of relay 88 becomes energized, opening the motor circuit at the armature 87 and contact 89'. The throttle rod 18 is then positioned according to the selected speed and will remain in its adjusted position until the brake pedal 24 is depressed, providing the release action above described or until the speed selector knob 30 is rotated to a different position, allowing the contact 52 to separate from the contact 50 and deenergizing the winding of relay 88. In order to reduce the speed of the vehicle, it is first necessary to apply the brakes, to return the elements of the speed control device to their initial positions, while the speed selector knob 30 is adjusted to a reduced speed position. To increase the speed of the vehicle, it is merely necessary to rotate the speed selector knob 30 to the increased desired speed value, which will open the switch contacts 52, 50 until the follower member 51 again engages the plunger head 56, to reenergize the winding of relay 88.

Referring now to the form of the invention illustrated in Figures 9, 10 and 11, 101 designates a generally cylindrical housing which is mounted on the vehicle dashboard 102, said housing containing a conventional speedometer assembly 103 coupled to the transmission of the motor vehicle, or to any other rotating part of the vehicle, in the normal manner and having the longitudinal, rotary indicator shaft 104. Shaft 104 is provided with the radially extending indicating pointer 105 which is movable with respect to the front face 106 of an annular body 107 of insulating material, the internal surface of said annular member 107 being provided with respective pairs of spaced contacts 108, 109. Secured to the speedometer shaft 104 is an arm 110 carrying a conductive bridging member 111 which is engageable with pairs of spaced contacts 108, 109 corresponding to the different speed values of the vehicle.

The housing 101 is provided with the transparent front wall 112 having respective radially spaced pairs of contact elements 113 and 114 mounted therein at locations corresponding to the speed values associated with the respective pairs of contacts 108, 109. Thus, pairs of contacts 113, 114 and 108, 109 may be provided at speed increments of 10 miles per hour around the axis of the housing 101, said values being inscribed adjacent the respective pairs of contacts 13, 14 on the transparent front wall 112 of the instrument.

Rotatably mounted in the front wall 112 of the instrument, coaxially with the speedometer shaft 104, and being freely rotatable with respect to the shaft 104 is a speed-selecting shaft 115 provided at its outer end with a knob 116 and a radial arm 117, movable with knob 116. Arm 117 is provided with a contact-engaging portion 118 adapted to simultaneously engage a selected pair of contacts 113, 114 and to conductively bridge said contacts.

Mounted in the forward portion of housing 101 is a normally closed reset switch 119 having an actuating element 120 which is engagaable by a lug 121 on the shaft 115 to open the switch 119 when the pointer arm 117 is returned to a zero position.

A housing containing a motor 39', similar to the motor 39 and associated housing described in connection with the form of the invention of Figures 1 to 7 is provided, except that the mechanism does not have pawl and ratchet means corresponding to the pawl and ratchet means 61, 62 shown in Figure 4. Furthermore, the motor 39' is of a reversible type, which may be reversed in rotation responsive to a reversal of polarity of the voltage applied thereto. Thus, the motor 39' is similar to the motor 39, and the mechanism associated with the motor 39', including suitable gearing and clutch means 74, 74, as provided in the embodiment of the invention shown in Figures 9, 10 and 11, with the exception of the pawl and ratchet means limiting reversal of the mechanism, and otherwise is fully illustrated in Figure 4.

The direction of rotation of the motor 39' is controlled by a reversing relay 122 having the respective armatures 123 and 124, as shown in Figure 11. In the deenergized condition of relay 122, armatures 123 and 124 engage respective contacts 125 and 126, whereas the armatures 123 and 124 engage closing contacts 127 and 128 when the relay is energized.

A wire 130 is connected to the ungrounded terminal of the battery 83 through a main control switch 82. Each of the respective contacts 109 is connected to the wire 130. The respective contacts 108 are connected by respective wires 132 to the contacts 113 longitudinally aligned therewith. The contacts 109 are all connected together and to a common wire 133. The wire 133 is connected to one terminal of the winding of a motor controlled relay 134, the other terminal of the relay winding being connected to ground, as shown. Relay 134 has an armature 135 and a stationary contact 136. Stationary contact 136 is connected to wire 130. Armature 135 is connected by a wire 137 to one terminal of the reset switch 119. The other terminal of the reset switch is connected by a wire 138 to relay contact 125. As shown, relay contact 125 is connected to relay contact 128.

The upper relay contact 127 is connected to ground, as is one terminal of the winding of the relay 122. The lower relay contact 126 is likewise connected to ground.

The ungrounded terminal of relay 122 is connected to a wire 140, which in turn is connected through a manually controlled switch 141 to the wire 130. When switch 141 is closed, the relay 122 is energized and its armatures 123 and 124 are raised. The motor 39' has respective terminal wires 143 and 144 which are connected to the respective armatures 123 and 124. Normally, terminal wire 143 is connected to wire 130 through armature 123, contact 125, wire 138, reset switch 119, wire 137, armature 135, and contact 136. Under these conditions, the terminal wire 144 of the motor is connected to ground through armature 124 and contact 126. When relay 122 is energized, by the closure of switch 141, assuming switch 82 to be closed, as was assumed in the previous statement, armatures 123 and 124 are elevated, thus connecting terminal wire 144 of motor 39' to the battery wire 130 and connecting the motor terminal wire 143 to ground, providing a reversal of the motor 39' from the previously described position.

To establish a desired speed of the vehicle, the control knob 116 is rotated to place the bridging element 118 across a pair of contacts 113 and 114 corresponding to the desired speed value. By then closing switch 82, motor 39' becomes energized in its forward direction by a circuit comprising battery 83, switch 82, wire 130, relay contacts 135, 136, wire 137, closed reset switch 119, wire 138, relay contacts 125, 123, wire 143, and the motor winding, wire 144, relay contacts 124, 126 and ground. This actuates the throttle rod positioning member 72 and causes the throttle rod 18 to be moved to a position corresponding to the desired vehicle speed. When the speedometer-operated contact element 111 bridges a pair of contacts 108, 109 corresponding to the selected speed, the motor controlled relay 134 becomes energized by a circuit comprising wire 130, the bridged contacts 108, 109, the associated wire 132, the associated bridge contacts 113, 114, wire 133, the winding of relay 134 and ground. Deenergization of relay 134 opens the motor circuit by disengaging armature 135 from contact 136, whereby the motor is disconnected from the battery wire 130. The throttle rod 18 will then be maintained in the adjusted position until brake pedal 24 is depressed, as in the previously described form of the invention, to release the elements and allow them to return to their idling positions, or the setting of the control knob 16 is changed to a different speed value. When the setting is changed to a reduced speed value, the reversing switch 141 must be closed, in order to allow the motor to reverse its direction of movement and to operate until the desired reduced speed has been reached. When the speedometer operated contact member 111 reaches a position corresponding to the reduced speed, the motor controlled relay 134 will again become energized, terminating the operation of the motor and maintaining the throttle rod positioning member 72 at a position corresponding to the desired reduced speed. Conversely, to increase the speed of the vehicle, the selector knob 116 is rotated to an increased speed value, which deenergizes the control relay 134 and maintains the control relay deenergized until the speedometer-controlled contact member 111 reaches a position corresponding to the increased speed value, at which position the motor control relay 134 again becomes energized, stopping the motor with the throttle rod positioning member 72 at a position corresponding to the desired increased speed.

While certain specific embodiments of a speed controlling system for a motor vehicle have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle having a movable throttle member controlling the speed of the vehicle, and a brake pedal, a manual speed selector, a throttle-positioning motor, a driven member engageable with said throttle member to move same responsive to movement of said driven member, electrically operated clutch means drivingly coupling said driven member to said motor, switch means controlled by said brake pedal and formed and arranged to energize said clutch means responsive to actuation of said brake pedal, an energizing circuit connected to said motor, and switch means operated by said manual speed selector and controlling said energizing circuit.

2. In a motor vehicle having a movable throttle member controlling the speed of the vehicle and a brake pedal, a manual speed selector, a throttle-positioning motor, a driven member engageable with said throttle member to move same responsive to rotation of said driven member, electrically operated clutch means drivingly coupling said driven member to said motor, said clutch means being normally deenergized and being formed and arranged to disengage said driven member from said motor responsive to energization thereof, a first energizing circuit connected to said motor, switch means operated by said manual speed selector and controlling said first energizing circuit, a second energizing circuit, normally open switch means in said second energizing circuit, and means closing said last-named switch means responsive to actuation of said brake pedal.

3. In a motor vehicle having a rectilinearly movable throttle rod, a positioning motor, means connected to the motor drivingly engageable with said throttle rod, a manual speed selector having a plurality of speed selecting positions, an energizing circuit connected to said motor, a movable control element positioned in accordance with the position of said speed selector, a follower member driven by said motor and being engageable with said control element, and a switch operated responsive to the engagement of said control element with said follower member to open said energizing circuit, whereby said motor will be de-energized and said throttle rod will be in a position corresponding to a selected speed position of said speed selector.

4. In a motor vehicle having a rectilinearly movable throttle rod, a positioning motor, means connected to the motor drivingly engageable with said throttle rod, a manual speed selector having a plurality of speed selecting positions, an energizing circuit connected to said motor, a movable control element positioned in accordance with the position of said speed selector, a follower member driven by said motor and being engageable with said control element, a switch operated responsive to the engagement of said control element with said follower member to open said energizing circuit, whereby said motor will be de-energized and said throttle rod will be in a position corresponding to a selected speed position of said speed selector, a further switch in the energizing circuit of the motor, and means opening said last-named switch when the manual speed selector is returned to a zero speed position.

5. In a motor vehicle having a rectilinearly movable throttle rod and a brake pedal, a positioning motor, means connected to the motor drivingly engageable with said throttle rod, a manual speed selector having a plurality of speed selecting positions, an energizing circuit connected to said motor, a movable control element positioned in accordance with the position of said speed selector, a follower member driven by said motor and being engageable with said control element, a switch operated responsive to the engagement of said control element with said follower member to open said energizing circuit, whereby said motor will be de-energized and said throttle rod will be in a position corresponding to a selected speed position of said speed selector, and means uncoupling said follower member from said motor responsive to actuation of said brake pedal.

6. In a motor vehicle having a rectilinearly movable throttle rod and a brake pedal, a positioning motor, means connected to the motor drivingly engageable with said throttle rod, a manual speed selector having a plurality of speed selecting positions, an energizing circuit connected to said motor, a movable control element positioned in accordance with the position of said speed selector, a follower member driven by said motor and being engageable with said control element, a switch operated responsive to the engagement of said control element with said follower member to open said energizing circuit, whereby said motor will be de-energized and said throttle rod will be in a position corresponding to a selected speed position of said speed selector, a further switch in the energizing circuit of the motor, means opening said last-named switch when the manual speed selector is returned to a zero speed position, and means uncoupling said follower member from said motor responsive to actuation of said brake pedal.

7. In a motor vehicle having a rectilinearly movable throttle rod, a positioning motor, means connected to the motor drivingly engageable with said throttle rod, a manual speed selector having a plurality of speed selecting positions, an energizing circuit connected to said motor, a movable control element, means mechanically coupling said control element to said speed selector, a follower member driven by said motor and being engageable with said control element, and a switch operated responsive to the engagement of said control element with said follower member to open said energizing circuit, whereby said motor will be de-energized and said throttle rod will be in a position corresponding to a selected speed position of said speed selector.

8. In a motor vehicle having a rectilinearly movable throttle rod and a brake pedal, a positioning motor, means connected to the motor drivingly engageable with said throttle rod, a manual speed selector having a plurality of speed selecting positions, an energizing circuit connected to said motor, a movable control element, electromagnetic clutch disengaging means controlled by said brake pedal and coupling said control element to said speed selector, a follower member driven by said motor and being engageable with said control element, a switch operated responsive to the engagement of said control element with said follower member to open said energizing circuit, whereby said motor will be de-energized and said throttle rod will be in a position corresponding to a selected speed position of said speed selector.

References Cited in the file of this patent

UNITED STATES PATENTS

| 2,228,393 | Leaming | Jan. 14, 1941 |
| 2,566,859 | Seeler | Sept. 4, 1951 |